US008954017B2

(12) United States Patent
Kothari et al.

(10) Patent No.: US 8,954,017 B2
(45) Date of Patent: Feb. 10, 2015

(54) CLOCK SIGNAL MULTIPLICATION TO REDUCE NOISE COUPLED ONTO A TRANSMISSION COMMUNICATION SIGNAL OF A COMMUNICATIONS DEVICE

(75) Inventors: Love Kothari, Sunnyvale, CA (US); Ajat Hukkoo, Cupertino, CA (US); Kerry Alan Thompson, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 373 days.

(21) Appl. No.: 13/247,295

(22) Filed: Sep. 28, 2011

(65) Prior Publication Data

US 2013/0045779 A1 Feb. 21, 2013

Related U.S. Application Data

(60) Provisional application No. 61/524,538, filed on Aug. 17, 2011.

(51) Int. Cl.
*H04B 1/40* (2006.01)

(52) U.S. Cl.
USPC ............ 455/76; 455/572; 455/260; 455/63.1; 455/114.2; 455/67.13; 455/550.1; 370/318; 370/329; 375/294; 375/327; 375/376

(58) Field of Classification Search
USPC ................. 455/76, 550.1, 552.1, 557, 414.1, 455/556.1, 556.2, 63.1, 67.13, 114.2, 260, 455/572
See application file for complete search history.

(56) References Cited

U.S. PATENT DOCUMENTS

| | | | | | |
|---|---|---|---|---|---|
| 4,775,997 | A | * | 10/1988 | West et al. | 455/557 |
| 5,590,400 | A | * | 12/1996 | Lopponen | 455/509 |
| 5,873,039 | A | * | 2/1999 | Najafi | 455/454 |
| 6,452,364 | B1 | * | 9/2002 | Saeki et al. | 320/137 |
| 6,658,237 | B1 | * | 12/2003 | Rozenblit et al. | 455/83 |
| 6,977,979 | B1 | * | 12/2005 | Hartwell et al. | 375/354 |
| 7,184,511 | B2 | * | 2/2007 | Younis et al. | 375/374 |
| 7,505,541 | B1 | * | 3/2009 | Brunn et al. | 375/360 |
| 7,902,654 | B2 | * | 3/2011 | Choa-Eoan et al. | 257/691 |
| 8,050,375 | B2 | * | 11/2011 | Staszewski et al. | 375/373 |
| 8,095,813 | B2 | * | 1/2012 | Pernia et al. | 713/322 |
| 8,129,953 | B2 | * | 3/2012 | Pagano | 320/141 |
| 8,134,411 | B2 | * | 3/2012 | Shi et al. | 331/1 A |
| 8,145,670 | B2 | * | 3/2012 | Yasaki et al. | 707/781 |
| 8,175,545 | B2 | * | 5/2012 | Rofougaran | 455/77 |
| 8,175,548 | B2 | * | 5/2012 | O'Keeffe et al. | 455/91 |
| 8,198,868 | B2 | * | 6/2012 | Pagano | 320/164 |
| 8,306,174 | B2 | * | 11/2012 | Murphy et al. | 375/371 |
| 8,331,898 | B2 | * | 12/2012 | Waters et al. | 455/343.1 |
| 8,477,631 | B2 | * | 7/2013 | Ramakrishnan et al. | 370/241 |
| 2005/0017676 | A1 | * | 1/2005 | Takimoto et al. | 320/107 |
| 2008/0122405 | A1 | * | 5/2008 | Fujikura | 320/149 |

* cited by examiner

*Primary Examiner* — Marceau Milord
(74) *Attorney, Agent, or Firm* — Sterne, Kessler, Goldstein & Fox P.L.L.C.

(57) ABSTRACT

A communications device is disclosed that implements a phase-locked-loop to multiply a clock signal provided to a power management unit (PMU) by a variable integer value. Multiplying the PMU clock signal provides a second clock signal where the second clock signal is characterized by a fundamental component with one or more harmonics of the fundamental component that differ from the fundamental component and the one or more harmonics of the PMU clock signal. The fundamental component with one or more harmonics of the second clock signal does not occupy the same communication channel as the transmission communication signal of the communications device. Thus, minimizing the degradation of the transmission communication signal.

24 Claims, 4 Drawing Sheets

CLOCK SIGNAL MULTIPLICATION TO REDUCE NOISE COUPLED ONTO A TRANSMISSION COMMUNICATION SIGNAL OF A COMMUNICATIONS DEVICE

CROSS-REFERENCE TO RELATED APPLICATIONS

This application claims the benefit of U.S. Provisional Application No. 61/524,538, filed on Aug. 17, 2011, which is incorporated herein by reference in its entirety.

BACKGROUND

1. Field of Invention

The present invention relates generally to a cellular phone and specifically to a power management unit for the cellular phone.

2. Related Art

Cellular phones have evolved from large devices that were only capable of analog voice communications to comparatively smaller devices that are capable of digital voice communications and digital data communications, such as Short Message Service (SMS) for text messaging, email, packet switching for access to the Internet, gaming, Bluetooth, and Multimedia Messaging Service (MMS) to provide some examples. In addition to these capabilities, the cellular phones of today have additional non-communication related capabilities, such as a camera with video recording, an MPEG-1 Audio Layer 3 (MP3) player, and software applications such as a calendar and a phone book, to provide some examples. Even in light of these capabilities, manufacturers of cellular phones are placing even more capabilities into cellular phones and making these more powerful cellular phones smaller.

At the heart of each cellular phone lies a power management unit (PMU). The PMU is responsible for monitoring power connections and battery charges, charging batteries when necessary, and controlling power to other integrated circuits, as well as other power functions of the cellular phone. For example, the PMU may provide power to other integrated circuits of the cellular phone such as a radio frequency (RF) transceiver. The RF transceiver uses a portion of the frequency spectrum that is allocated to the cellular phone, commonly referred to as a communication channel, to provide bi-directional communication between the cellular phone and a cellular network. The PMU is often clocked using a frequency whose harmonics fall within the communication channel currently being used by the RF transceiver. In doing so, the PMU couples noise onto this communication channel.

Global System for Mobile Communications (GSM) is a global cellular network communication standard that defines boundaries in noise that a cellular phone may transmit onto the cellular network. The noise coupled onto the communication channel by the PMU may cause the cellular phone to exceed these boundaries. As a result, the cellular phone may be prohibited from communicating on the cellular network.

Thus, there is a need to adjust the operating frequency of the PMU so that the harmonics of the operating frequency do not fall within the frequency channel being used by the RF transceiver. Further aspects and advantages of the present invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
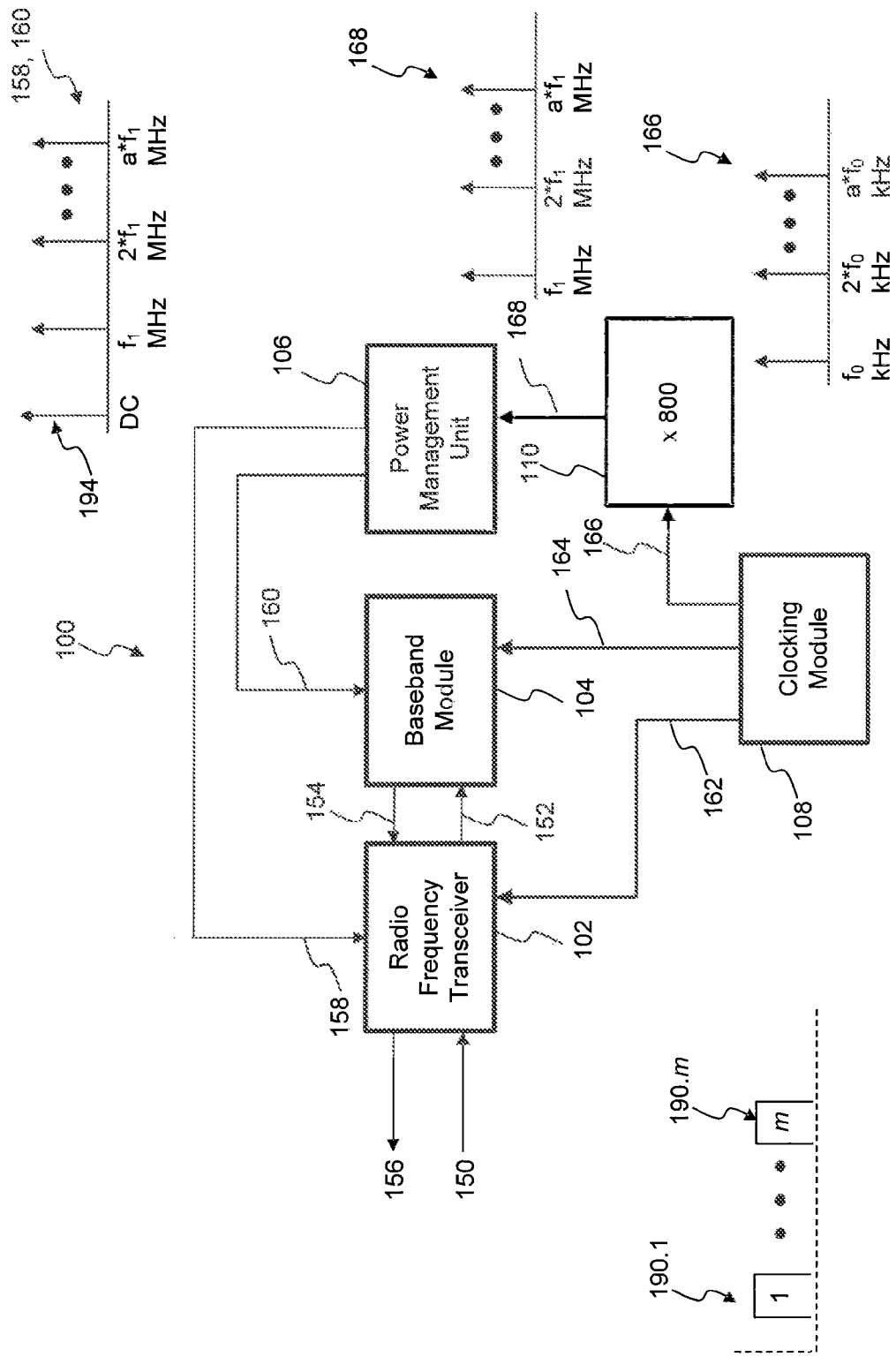
FIG. 1 illustrates a block diagram of a conventional cellular phone.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Conventional Cellular Phone

FIG. 1 illustrates a block diagram of a conventional cellular phone. A conventional cellular phone 100 represents a communications device used for voice or data communications from a near-end user to a far-end user over a cellular network. The conventional cellular phone 100 may communicate with one or more fixed location transceivers, referred to as cell sites, within the cellular network. The cell sites are connected to a cellular telephone exchange that connects to a public telephone network or to another cellular telephone exchange within the cellular network allowing the near-end user to communicate, via the conventional cellular phone 100, with the far-end user.

The conventional cellular phone 100 includes a radio frequency (RF) transceiver 102, a baseband module 104, a power management unit (PMU) 106, a clocking module 108, and a conventional multiplication module 110. The RF transceiver 102 downconverts, demodulates, and/or decodes a received communication signal 150 from a communication channel to provide a recovered communications signal 152. The RF transceiver 102 upconverts, modulates, and/or encodes an information bearing signal 154 to provide a transmitted communications signal 156. In an exemplary embodiment, the received communication signal 150 and/or the transmitted communications signal 156 may occupy a portion of physical spectrum that is separated into one or more communication channels 190.1 through 190.m in accordance with a communication standard. For example, the one or more communication channels 190.1 through 190.m may represent some or all of the communication channels in one or more of the fourteen bands of the GSM communication standard.

The baseband module 104 controls operation of the conventional cellular phone 100. The baseband module 104 recovers information, such as voice, data, and/or commands to provide some examples, from the recovered communications signal 152. The baseband module 104 provides information, as voice, data, and/or commands to provide some examples, as the information bearing signal 154. This information may be received as an input from a user of the conventional cellular phone 100 or may be generated by the baseband module 104 in response to performing a command.

The PMU 106 is responsible for battery and power system management for the conventional cellular phone 100. The PMU 106 monitors power connections and battery charges, charges batteries when necessary, and/or controls the power being supplied to other integrated circuits, as well as other power functions of the conventional cellular phone 100. For example, the PMU 106 may include one or more battery chargers to charge the battery from an external alternating current (AC) and/or direct current (DC) source. As another example, the PMU 106 may provide and/or control power to one or more components included in the conventional cellular phone 100, such as the baseband module 104 and/or the RF transceiver 102 to provide some examples. The PMU 106 also monitors current, voltages, and/or temperature readings, within the conventional cellular phone 100.

Additionally, the PMU 106 regulates whether the conventional cellular phone 100 is in an activated state, a deactivated state, and/or sleep state. For example, the PMU 106 provides a transceiver power signal 158 and a baseband power signal 160, each at a first level, to activate the RF transceiver 102 and the baseband module 104 so that the conventional cellular phone 100 is in the activated state. In another example, the PMU 106 provides the transceiver power signal 158 at a second level, typically approximately zero volts to provide an example, to deactivate the RF transceiver 102 and/or the baseband power signal 160 to deactivate the baseband module 104 so that the conventional cellular phone 100 is in the deactivated state. In a further example, the PMU 106 provides the transceiver power signal 158 at the second level and the baseband power signal 160 at a third level so that the conventional cellular phone 100 operates in the sleep state. The PMU 106 provides the transceiver power signal 158 at the second level to deactivate the RF transceiver 102. The PMU 106 also provides the baseband power signal 160 at the third level to activate the baseband module 104 so that the baseband module 104 operates with limited function such as maintaining memory states.

The clocking module 108 provides a transceiver clocking signal 162, a baseband clocking signal 164, and a PMU clocking signal 166 to the RF transceiver 102, the baseband module 104, and the PMU 106, respectively. The clocking module 108 may be an electronic oscillator circuit that uses the mechanical resonance of a vibrating crystal to create a clock signal with a precise frequency. The clocking module 108 may also include multipliers to multiply the clock signal of the electronic oscillator circuit to generate the transceiver clocking signal 162, the baseband clocking signal 164, and the PMU clocking signal 166. The PMU clocking signal 166 is characterized as having a fundamental component $f_0$ at a fundamental frequency of 32.625 kHz. The PMU clocking signal 166 may also include one or more harmonic components $2*f_0$ through $a*f_0$ that are integer multiples of the fundamental frequency.

The conventional multiplication module 110 multiplies the PMU clocking signal 166 by 800 to provide a PMU clocking signal 168. The PMU clocking signal 168 may include a fundamental component $f_1$ at a fundamental frequency of 26.21 MHz. The PMU clocking signal 168 may also include one or more harmonic components $2*f_1$ through $a*f_1$ that are integer multiples of the fundamental frequency. One or more of these harmonic components $2*f_1$ through $a*f_1$ typically falls within one or more communication channels 190.1 through 190.m that are presently occupied by the received communication signal 150 and/or the transmitted communication signal 156. For example, the PMU clocking signal 168 may include a harmonic component at 943.56 MHz which is a harmonic multiple of its fundamental frequency of 26.21 MHz. In this example, the harmonic component of 943.56 MHz occupies channel 5 of the GSM communication standard that covers 936 MHz to 958 MHz.

The PMU 106 provides the transceiver power signal 158 and the baseband power signal 160 to the RF transceiver 102 and the baseband power signal 160, respectively. Ideally, the transceiver power signal 158 and/or the baseband power signal 160 may include a direct current (DC) power signal 194. However, imperfections within the PMU 106 may cause the fundamental component $f_1$ and the one or more harmonic components $2*f_1$ through $a*f_1$ of the PMU clocking signal 168, although attenuated, to be coupled onto the direct current (DC) power signal 194.

The RF transceiver 102 uses the transceiver power signal 158 to upconvert, to modulate, and/or to encode the information bearing signal 154 to provide the transmitted communications signal 156. Consequentially, the RF transceiver 102 may couple the fundamental component $f_0$ and the one or more harmonic components $2*f_1$ through $a*f_1$ of the PMU clocking signal 168 that are embedded within the transceiver power signal 158 onto the transmitted communications signal 156 while operating on the information bearing signal 154. One or more of these components falls within one or more communication channels 190.1 through 190.m that are presently occupied by the received communication signal 150 and/or the transmitted communication signal 156.

For example, the PMU clocking signal 168 may include a fundamental component $f_1$ at a fundamental frequency of 26.21 MHz and one or more harmonic components at integer multiples of 26.21 MHz, such as 52.42 MHz, 78.63 MHz, and/or 104.84 MHz to provide some examples. Imperfections within the PMU 106 may cause the fundamental component $f_1$ and the one or more harmonic components of the PMU clocking signal 168, although attenuated, to be coupled onto the DC power signal 194. The RF transceiver 102 may couple the fundamental component $f_1$ and the one or more harmonic components onto the transmitted communications signal 156 while operating on the information bearing signal 154. A harmonic component of the PMU clocking signal 168 at a frequency of 943.56 (36*26.21) MHz falls within channel 5 of the GSM communication standard thereby degrading the received communication signal 150 and/or the transmitted communication signal 156 when using channel 5 of the GSM communication standard.

An Exemplary Communications Device

Figure 2:
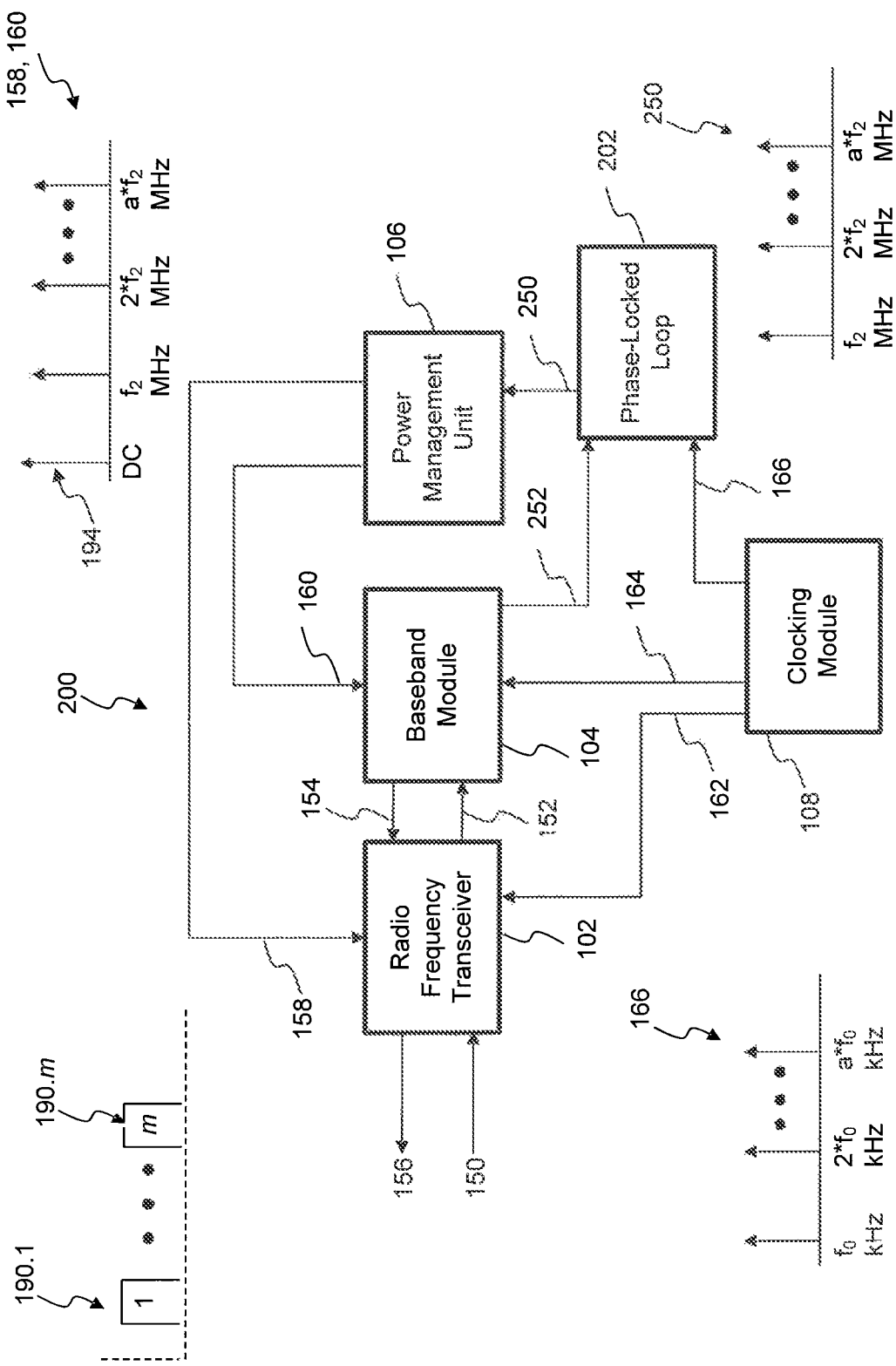
FIG. 2 illustrates a block diagram of a cellular phone according to an exemplary embodiment of the invention.

FIG. 2 illustrates a block diagram of a communications device according to an exemplary embodiment of the invention. In this exemplary embodiment, a phase lock loop (PLL) 202 is implemented as part of a communications device 200 to multiply the PMU clocking signal 166 by a variable integer value to provide a PLL clock signal 250 having a different frequency than the PMU clocking signal 166, thereby allowing a communications device 200 to use portions of the spectrum that were previously degraded by the fundamental component $f_1$ and/or the one or more harmonic components $2*f_1$ through $a*f_1$ of the PMU clocking signal 166. The communications device 200 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player and/or any other suitable electronic device that will be apparent to those skilled in the relevant art(s) without departing from the spirit and scope of the invention. The communications device 200 includes the RF transceiver 102, the baseband module 104, the PMU 106, the clocking module 108, and a PLL 202. The communications device 200 shares many similar features with the conventional cellular phone 100; therefore, only the differences between the conventional cellular phone 100 and the communications device 200 are to be discussed in further detail.

The clocking module 108 provides the PMU clocking signal 166 to the PLL 202. The PMU clocking signal 166 includes the fundamental component $f_0$ at the fundamental frequency and the one or more harmonic components $2*f_0$ through $a*f_0$ that are integer multiples of the fundamental frequency.

The PLL 202 multiplies the fundamental component $f_0$ of the PMU clocking signal 166 by a variable integer value to provide the PLL clock signal 250 having a fundamental component $f_2$ and one or more harmonic components $2*f_2$ through $a*f_2$ of the fundamental component $f_2$. The fundamental component $f_2$ may be at a frequency that may or may not be integrally related to the fundamental frequency of the fundamental component $f_0$ of the PMU clocking signal 166.

The PMU 106 provides the transceiver power signal 158 and the baseband power signal 160. Ideally, the transceiver power signal 158 and/or the baseband power signal 160 may include the DC power signal 194. However, imperfections within the PMU 106 may cause the fundamental component $f_2$ and the one or more harmonic components $2*f_2$ through $a*f_2$ of the PLL clock signal 250, although attenuated, to be coupled onto the direct current (DC) power signal 194.

The RF transceiver 102 uses the transceiver power signal 158 to upconvert, to modulate, and/or to encode the information bearing signal 154 to provide the transmitted communications signal 156. Consequentially, the RF transceiver 102 may couple the fundamental component $f_2$ and the one or more harmonic components $2*f_2$ through $a*f_2$ of the PLL clock signal 250 that are embedded within the transceiver power signal 158 onto the transmitted communications signal 156 while operating on the information bearing signal 154.

Although the fundamental component $f_2$ and the one or more harmonic components $2*f_2$ through $a*f_2$ are coupled onto the transmitted communications signal 156, the communications device 200 may use portions of the spectrum that were previously degraded by the fundamental component $f_1$ and/or the one or more harmonic components $2*f_1$ through $a*f_1$. The fundamental component $f_2$ may be selected such that the one or more harmonic components $2*f_2$ through $a*f_2$ no longer occupy the spectrum occupied by the received communication signal 150 and/or the transmitted communication signal 156. Alternatively, the fundamental component $f_2$ may be selected such that the one or more harmonic components $2*f_2$ through $a*f_2$, even though they occupy the spectrum occupied the received communication signal 150 and/or the transmitted communication signal 156, do not degrade the received communication signal 150 and/or the transmitted communication signal 156 as much as the one or more harmonic components $2*f_1$ through $a*_1$. In other words, the fundamental component $f_2$ and the one or more harmonic components $2*f_2$ through $a*f_2$ may generate less interference in the received communication signal 150 and/or the transmitted communication signal 156 when compared to the fundamental component $f_1$ may the one or more harmonic components $2*f_1$ through $a*f_1$.

For example, the PMU clocking signal 166 may include a fundamental component $f_0$ at a fundamental frequency of 26.21 MHz and one or more harmonic components at integer multiples of 26.21 MHz, such as 32.2 MHz, 64.4 MHz, and/or 128.8 MHz to provide some examples. A harmonic component of the PMU clocking signal 166 at a frequency of 943.56 MHz falls within channel 5 of the GSM communication standard thereby degrading the received communication signal 150 and/or the transmitted communication signal 156 when using channel 5 of the GSM communication standard. However, the PLL 202 multiplies the fundamental component $f_0$ of the PMU clocking signal 166 by approximately 790.4 to provide the PLL clock signal 250 having a fundamental component $f_1$ at a fundamental frequency of 25.9 MHz and one or more harmonic components at integer multiples of the fundamental frequency 25.9 MHz. The one or more harmonic components of the PLL clock signal 250 include harmonic components at 932.4 MHz and 958.3 MHz which do not occupy the spectrum occupied by channel 5 of the GSM communication standard that covers 936 MHz to 958 MHz. As a result, the communications device 200 may now use channel 5 of the GSM communication standard for communications.

As another example, the PLL 202 multiplies the fundamental component $f_0$ of the PMU clocking signal 166 by approximately 736 to provide the PLL clock signal 250 having a fundamental component $f_1$ at a fundamental frequency of 24.117 MHz and one or more harmonic components at integer multiples of the fundamental frequency 24.117 MHz. The one or more harmonic components of the PLL clock signal 250 include a harmonic component at 940.563 MHz which, even though it occupies the spectrum occupied by channel 5 of the GSM communication standard, does not degrade the received communication signal 150 and/or the transmitted communication signal 156 as much as the harmonic component at 943.56 MHz.

The baseband module 104 may provide a channel transmission signal 252 to the PLL 202. The baseband module 104 determines a frequency range in which the received communication signal 150 and/or the transmitted communication signal 156 may occupy, such as channel 5 of the GSM communication standard. Based on the frequency range, the baseband module 104 provides the channel transmission signal 252 to cause the PLL 202 to provide the PLL clock signal 250 having one or more harmonic components at integer multiples of its fundamental frequency that do not sufficiently degrade the received communication signal 150 and/or the transmitted communication signal 156. Typically, the channel transmission signal 252 indicates a divide ratio that is to be used by the PLL 202 to provide the PLL clock signal 250.

One or more components of the communications device 200, such as, the RF transceiver 102, the baseband module 104, the PMU 106, the clocking module 108, and the PLL 202, may be implemented on a semiconductor chip or die. For example, two or more of the components of the communications device 200 may be implemented on a common semiconductor chip or die. Alternatively, the one or more components of the communications device 200 may be each implemented on a single semiconductor chip or die. In another alternate, the one or more components of the communications device 200 may be implemented on any combination of common or single semiconductor chips or dies.

An Exemplary PLL

Figure 3:
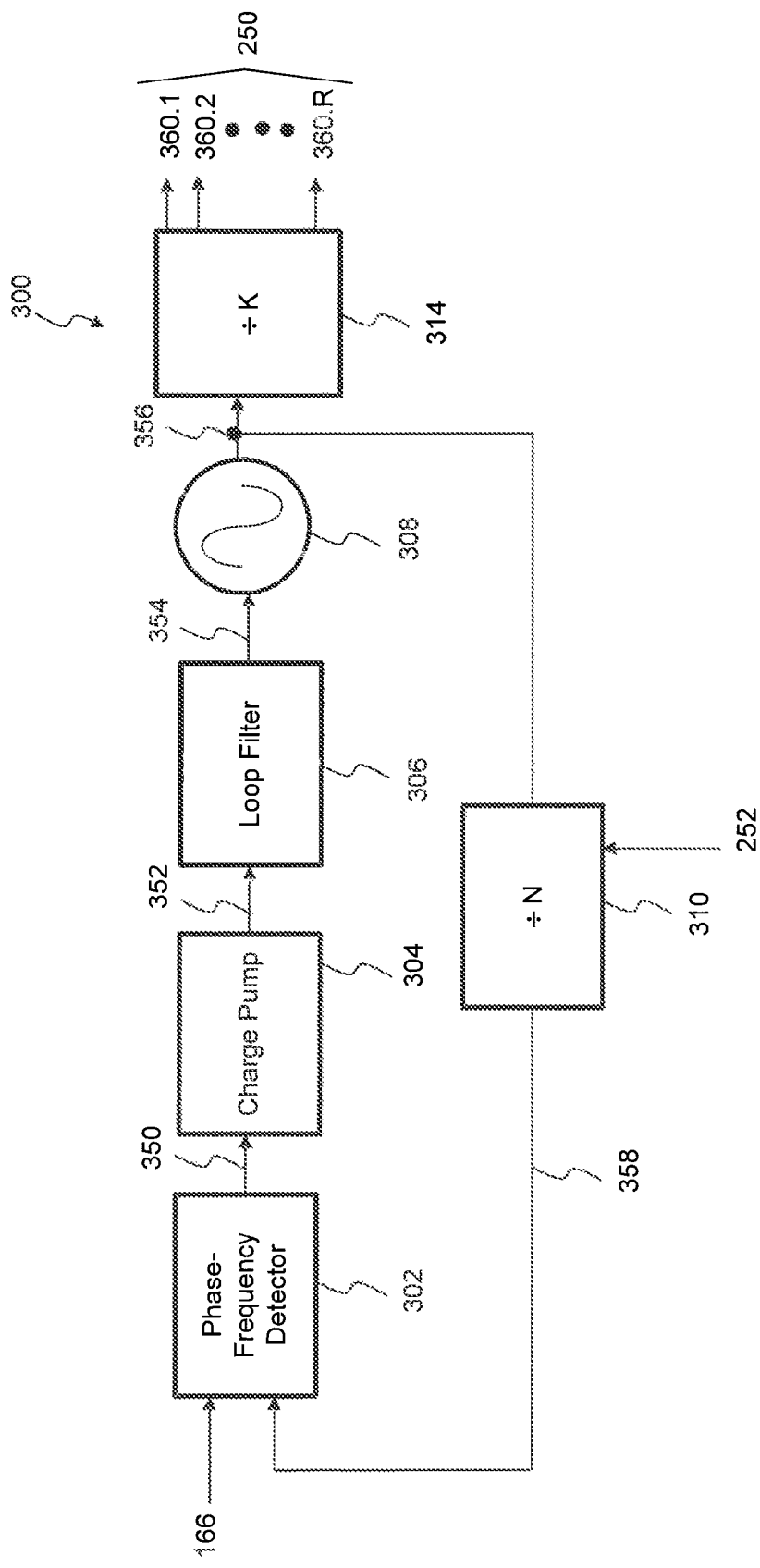
FIG. 3 is a block diagram of a PLL that may be used in the cellular phone according to an exemplary embodiment of the present invention.

FIG. 3 is a block diagram of a PLL that may be used in the communications device according to an exemplary embodiment of the present invention. A PLL 300 represents a closed-loop feedback control system that generates the PLL clock signal 250 in relation to a frequency and a phase of the PMU clocking signal 166. In other words, the PLL 300 performs frequency multiplication, via a negative feedback mechanism, to generate the PLL clock signal 250 in terms of the PMU clocking signal 166. The PLL 300 may be implemented using a phase/frequency detector (PFD) 302, a charge pump 304, a loop filter 306, a VCO 308, a frequency divider 310, and an output divider 314.

The PFD 302 is a device that converts the difference between the phase of the PMU clocking signal 166 and a phase of a divided feedback signal 358 into an error signal 350. The PFD 302 compares the PMU clocking signal 166 to the divided feedback signal 358 to generate the error signal 350. More specifically, the PFD 302 produces the error signal 350 by comparing a frequency and the phase of the divided feedback signal 358 to the frequency and the phase of the PMU clocking signal 166 to detect for deviations between the phase and/or frequency of the PMU clocking signal 166 and the phase and/or frequency of the divided feedback signal 358. When the phase and the frequency of the error signal 350 and the phase of the divided feedback signal 358 are substantially equivalent, the PLL 300 is in a locked condition. In the locked condition, the error signal 350 is proportional to the phase difference between the PMU clocking signal 166 and the divided feedback signal 358 minimizing the error signal 350.

The charge pump 304 converts the error signal 350 to a voltage domain representation, denoted as a charge pump output 352, to control the frequency of the VCO 308. When the PLL 300 is not in the locked condition, the charge pump 304 increases or decreases the charge pump output 352 based on the error signal 350. When the PLL 300 is in the locked condition the error signal 350 is minimized and the charge pump 304 maintains the charge pump output 352 at a substantially fixed value.

The loop filter 306 may be used to remove undesirable noise from the charge pump output 352 to generate a tuning signal 354. The loop filter 306 may be implemented as a low pass filter to suppress high frequency components in the charge pump output 352 to allow a direct current (DC), or near DC, component of the charge pump output 352 to control the VCO 308.

The VCO 308 is a voltage to frequency converter. As shown in FIG. 3, the VCO 308 produces an intermediate clock signal 356 based upon the tuning signal 354. More specifically, the VCO 308 generates the intermediate clock signal 356 to correct for deviations between the frequency and/or phase of the PMU clocking signal 166 and the divided feedback signal 358 based upon the tuning signal 354. In other words, the VCO 308 responds to the tuning signal 354 by automatically raising or lowering the frequency of the intermediate clock signal 356 until the frequency of the intermediate clock signal 356 is matched to the PMU clocking signal 166 in both frequency and phase.

The integer frequency divider 310 is located in a feedback path of the PLL 300. The integer frequency divider 310 provides the divided feedback signal 358 by dividing the intermediate clock signal 356 by an integer N such that the frequency of the divided feedback signal 358 substantially matches the frequency of the PMU clocking signal 166. The integer frequency divider 310 may adjust the integer N in response to the channel transmission signal 252. In an exemplary embodiment, the integer N may be any integer value between a first integer value of 736 and a second integer value 856 such that the intermediate clock signal 356 may be adjusted from 24.117 MHz to 28.1 MHz for the PMU clock signal 166 of 32.625 kHz.

The output divider 314 divides the frequency of the intermediate clock signal 356 by one or more integers K to provide PLL clock signals 360A through 360.R. The PLL clock signals 360.1 through 360.R may represent an exemplary embodiment of the PLL clock signal 250. Each of the one or more integers K may be substantially similar or different.

In an exemplary embodiment, the output divider 314 may include a divider to provide each of the PLL clock signals 360.1 through 360.R. Each divider that provides each of the PLL clock signals 360.1 through 360.R may divide the frequency of the intermediate clock signal 356 by one or more integers K. In an exemplary embodiment, each of the PLL clock signals 360.1 through 360.R may be substantially similar or different based on the one or more integers K used by the divider to provide each of the PLL clock signals 360.1 through 360.R.

For example, the intermediate clock signal 356 may have a fundamental component at 26.21 MHz. The output divider 314 may provide PLL clock signals of 360.1 at 26.21 MHz, 360.2 at 26.21 MHz, 360.3 at 13.105 MHz, 360.4 at 13.105 MHz, 360.5 at 13.105 MHz, and 360.6 at 1.09 MHz. The output divider 314 may include a divider that divides the intermediate clock signal 356 by 1 to provide the PLL clock signal 360.1 at 26.21 MHz. The output divider 314 may include a divider that divides the intermediate clock signal 356 by 1 to provide the PLL clock signal 360.2 at 26.21 MHz. The output divider 314 may include a divider that divides the intermediate clock signal 356 by 2 to provide the PLL clock signal 360.3 at 13.105 MHz. The output divider 314 may include a divider that divides the intermediate clock signal 356 by 2 to provide the PLL clock signal 360.4 at 13.105 MHz. The output divider 314 may include a divider that divides the intermediate clock signal 356 by 2 to provide the PLL clock signal 360.5 at 13.105 MHz. The output divider 314 may include a divider that divides the intermediate clock signal 356 by 24 to provide the PLL clock signal 360.6 at 1.09 MHz. In another example, all of the dividers as described in the previous example may be implemented using a singer counter.

An Exemplary Operational Control Flow of the Communication Device

Figure 4:
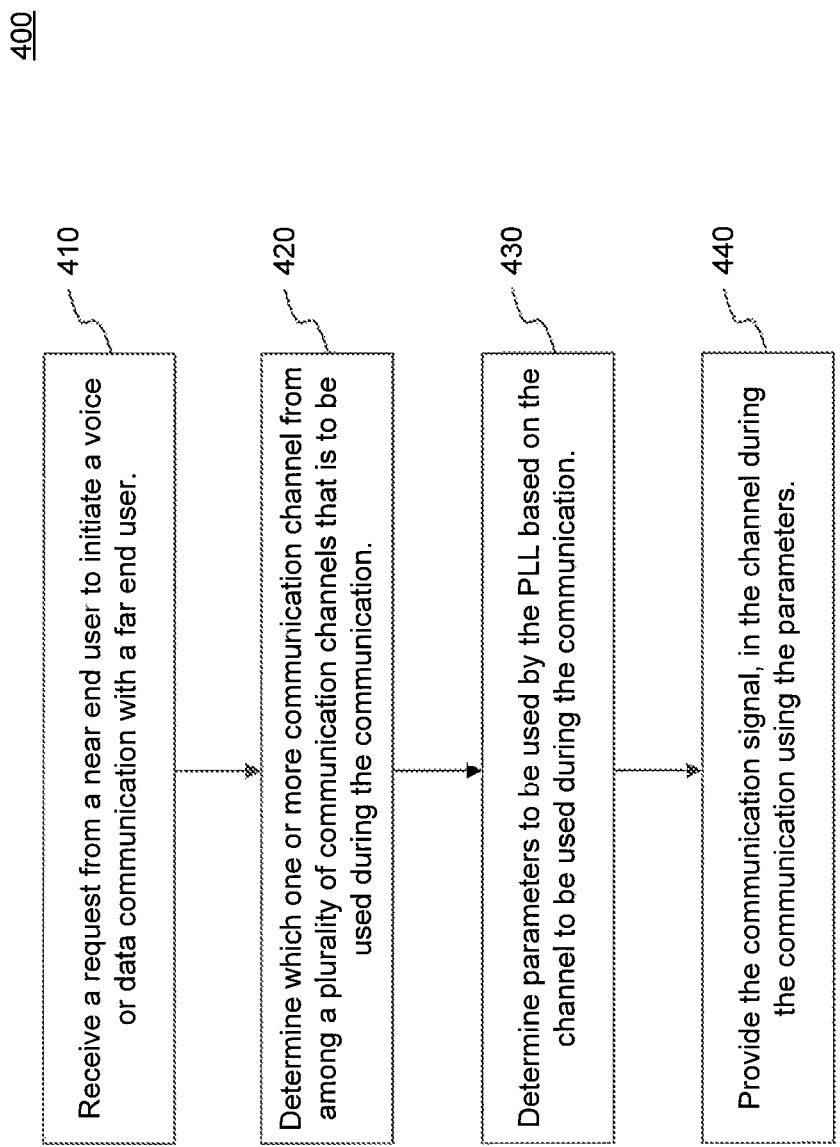
FIG. 4 is a flowchart of exemplary operational steps of the PLL according to an exemplary embodiment of the present invention.

FIG. 4 is a flowchart of exemplary operational steps of the communication device according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 4.

At step 410, the operational control flow receives a request from a near end user to initiate a voice or data communication with a far end user.

At step 420, the operational control flow determines which one more communication channel from among a plurality of communication channels that is to be used during the communication. For example, the operational control flow may determine the channel, such as channel 5 from the GSM communication standard, to provide an example, to be used by the communication.

At step 430, the operational control flow determines parameters to be used by the PLL based on the channel to be used during the communication. For example, the operational control flow may use channel 5 from the GSM communication standard during the communication. In this example, the operational control flow determines a divide ratio to be used by a PLL, such as PLL 202, so that a fundamental component and one or more harmonics of the fundamental component do not substantially degrade a transmitted communication signal, such as transmitted communication signal 156, that is to occupy channel 5 during the communication.

At step 440, the operational control flow provides the communication signal, in the channel during the communication using the parameters from step 430.

CONCLUSION

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A communications device, comprising:
a clocking module configured to provide a clocking signal;
a phase-locked loop (PLL) configured to multiply the clocking signal by a variable integer value to provide a PLL clock signal;
a power management unit (PMU) configured to receive the PLL clock signal and provide a power signal based on the PLL clock signal; and
a radio frequency (RF) transceiver configured to operate on an information bearing signal using the power signal to provide a transmission communication signal.

2. The communications device of claim 1, further comprising:
a baseband module configured to receive input information, and to provide the input information in the information bearing signal to the RF transceiver.

3. The communications device of claim 2, wherein the baseband module is further configured to provide a channel transmission signal to the PLL to set a value for the variable integer value.

4. The communications device of claim 3, wherein the transmission communication signal is configured to occupy a communication channel from among a plurality of communication channels.

5. The communications device of claim 4, wherein the baseband module is further configured to determine the communication channel that is occupied by the transmission communication signal.

6. The communications device of claim 4, wherein the PLL clock signal includes a fundamental component and one or more harmonics of the fundamental component, the one or more harmonics not occupying the communication channel.

7. The communications device of claim 6, wherein the baseband module is further configured to compare the one or more harmonics of the fundamental component of the PLL clock signal with the communication channel that is occupied by the transmission communication signal.

8. The communications device of claim 7, wherein the baseband module is further configured to cause the PLL to multiply one or more harmonics of the fundamental component for the clocking signal by a second value when at least one of the one or more harmonics of the PLL clock signal occupy the communication channel occupied by the transmission communication signal.

9. The communications device of claim 4, wherein the power signal includes a direct current (DC) component, a fundamental component of the PLL clock signal, and one or more harmonics of the fundamental component, wherein the variable integer value is selected so that the one or more harmonics do not occupy the communication channel.

10. The communications device of claim 9, wherein the DC component provides power for operation of the RF transceiver.

11. The communications device of claim 1, wherein the PLL is configured to multiply the clocking signal by a first integer value to produce a first PLL clock signal having a first fundamental component and one or more harmonics of the first fundamental component.

12. The communications device of claim 11, wherein the PLL is configured to multiply the clocking signal by a second integer value to produce a second PLL clock signal having a second fundamental component and one or more harmonics of the second fundamental component.

13. The communications device of claim 12, wherein the second integer value is chosen such that the one or more harmonics of the second fundamental component do not degrade the transmission communication signal as much as the one or more harmonics of the first fundamental component.

14. The communications device of claim 1, wherein the clocking module is configured to provide a transceiver clocking signal to the RF transceiver.

15. The communications device of claim 1, wherein the PLL is further configured to multiply the clocking signal to provide the PLL signal so that the transmission communication signal is not degraded by one or more harmonics of the PLL clock signal that occupies a communication channel of the transmission communication signal.

16. The communications device of claim 1, wherein the PLL comprises:
   a phase-frequency detector configured to output an error signal based on a difference between a feedback signal and the clocking signal;
   a voltage controlled oscillator configured to output an intermediate clock signal based on the error signal;
   a PLL output divider configured to output a plurality of PLL clock signals based on the intermediate clock signal; and
   a frequency divider configured to receive the intermediate clock signal and a channel transmission signal, wherein the feedback signal is generated by the frequency divider by dividing the intermediate clock signal by the variable integer value based on the channel transmission signal to match the clocking signal to the intermediate clock signal.

17. The communications device of claim 16, wherein the frequency divider is configured to adjust the intermediate clock signal by changing the variable integer value from a first integer value to a second integer value that the clocking signal is multiplied by.

18. The communications device of claim 17, wherein the frequency divider is configured to select the variable integer value from a plurality of integer values based on the channel transmission signal.

19. The communications device of claim 17, wherein the frequency divider comprises a plurality of dividers, wherein each divider in the plurality of dividers provides a corresponding PLL clock signal from the plurality of PLL clock signals.

20. The communications device of claim 1, wherein the variable integer value is based on a transmission channel over which the transmission communication signal is to be transmitted.

21. A communications device, comprising:
   a clocking module configured to provide a clocking signal;
   a phase-locked loop (PLL) configured to multiply the clocking signal by a variable integer value to provide a PLL clock signal;
   a power management unit (PMU) configured to provide a power signal based on the PLL clock signal; and
   a radio frequency (RF) transceiver configured to operate on an information bearing signal using the power signal to provide a transmission communication signal;
   wherein the PLL is further configured to multiply the clocking signal to provide the PLL clock signal so that a communication channel that is occupied by each of one or more harmonics of the PLL clock signal is different from a communication channel that is occupied by the transmission communication signal.

22. A method for reducing noise coupled to a communication signal provided by a cellular phone, the method comprising:
   providing a clocking signal;
   multiplying, by a phase-locked loop (PLL), the clocking signal by a variable integer value;
   providing a PLL clock signal based on the multiplying of the clocking signal by the variable integer value;
   receiving the PLL clock signal and providing a power signal based upon the received PLL clock signal;
   operating on an information bearing signal using the power signal; and
   providing a transmission communication signal based on the power signal.

23. A communications device, comprising:
   a phase-locked loop (PLL) configured to generate a PLL clock signal having a fundamental frequency component;
   a power management unit (PMU) configured to provide a power signal based on the PLL clock signal, wherein the power signal includes a DC component and one or more harmonics of the fundamental frequency component of the PLL; and
   a radio frequency (RF) transceiver, powered by the DC component of the power signal, and configured to operate on an information bearing signal to provide a transmission communication signal;
   wherein the PLL is controlled so that the one or more harmonics in the power signal do not occur in a frequency channel occupied by the transmission communication signal.

24. The communications device of claim 23, further comprising:
   a baseband module configured to determine the frequency channel occupied by the transmission communication signal and control a divider ratio of the PLL so that the one or more harmonics in the power signal do not occur in the frequency channel occupied by the transmission communication signal.

* * * * *